US006961256B2

(12) United States Patent  
Yang

(10) Patent No.: US 6,961,256 B2
(45) Date of Patent: Nov. 1, 2005

(54) SYNCHRONOUS RECTIFIER WITH DEAD TIME ADJUSTING FUNCTION

(75) Inventor: Hui Chiang Yang, Hsintien (TW)

(73) Assignee: Niko Semiconductor Co., Ltd., Taipei (TW)

( * ) Notice: Subject to any disclaimer, the term of this patent is extended or adjusted under 35 U.S.C. 154(b) by 77 days.

(21) Appl. No.: 10/777,099

(22) Filed: Feb. 13, 2004

(65) Prior Publication Data

US 2005/0180178 A1    Aug. 18, 2005

(51) Int. Cl.[7] ............................................. H02M 7/217
(52) U.S. Cl. ................ 363/127; 363/21.06; 363/21.14; 363/89
(58) Field of Search ........................... 363/21.06, 21.14, 363/48, 53, 89, 125, 126, 127

(56) References Cited

U.S. PATENT DOCUMENTS 6,191,964 B1 *  2/2001  Boylan et al. ................. 363/89
6,577,518 B2 *  6/2003  Abdoulin ...................... 363/127

* cited by examiner

Primary Examiner—Jessica Han
(74) Attorney, Agent, or Firm—Rosenberg, Klein & Lee

(57) ABSTRACT

A synchronous rectifier with dead time adjusting function is used in fly-back power supplies for adjusting dead time of switches. The synchronous rectifier has a rectifying circuit connected to a secondary side terminal of a transformer and outputting a positive half-cycle voltage, a charging circuit connected to the rectifying circuit for producing a first charging voltage and a second charging voltage, a regulated power circuit connected to the charging circuit and producing a reference voltage, a trigger circuit connected to the rectifying circuit and the charging circuit for generating a dead time adjusting comparing signal, a comparing circuit connected to the regulated circuit, the charging circuit and the trigger circuit for producing a dead time adjusting signal, and a logic circuit connected to the comparing circuit and the rectifying circuit for outputting a driving signal for controlling on/off states of a first electric switch.

10 Claims, 4 Drawing Sheets

SYNCHRONOUS RECTIFIER WITH DEAD TIME ADJUSTING FUNCTION

BACKGROUND OF THE INVENTION

1. Field of the Invention

A synchronous rectifier with dead-time adjusting function especially relates to a synchronous rectifier using fly-back power supply.

2. Description of Related Art

Most of prior art direct current power supplies, for example, AC to DC switching power supply, use high-frequency pulse width modulation (PWM) for shrinking the volume of a transformer. FIG. 1 shows a circuit schematic diagram of a prior art fly-back power supply. The circuit of a transformer T1 is divided into a front-stage circuit 101 at a primary side and a back-stage circuit 102 at a secondary side. Optical signals transferred between the primary side and the secondary side are separated by a photo transistor 111 and a photodiode 112, and changes of the current and the voltage of the secondary side can be fed back to the primary side by optical signals. Therefore, the changes of the current and the voltage in the primary side 101 and the secondary side 102 may be adjusted synchronously and the fed back signals can provide overcurrent protection and short protection.

Fly-back transformers include a circuit for transforming alternative current to direct current, and working principle thereof is: when a transistor Q1 is on, energy is stored in a transformer T1 because poles of primary side 101 are opposite the poles of the secondary side 102 and a transistor Q2 is off; after the poles of the transformer T1 are inverted, the transistor Q2 will be on and the energy stored in the transformer T1 will be released.

Dead time occurs when the transistor Q1 and the transistor Q2 are both off during a period of time. In prior art fly-back power supply, the duty cycle of the pulse width modulation for controlling DC output voltage is not fixed and it may worsen the use rate of the transistor Q2.

Delay occurs when the transistor Q1 and the transistor Q2 switch states; hence, the transistor Q1 and the transistor Q2 are both on temporarily at the same time, and it will cause the switching loss of the circuit. The switching loss will be more serious when the circuit is operated with high output voltage, and the transistor Q2 will be burned up easily.

Taiwan patent No. 519789 discloses a fly-back type power supply with synchronous rectifying function, in which a current comparator is connected to the secondary side of a transformer for acquiring the output loading current. A comparator is used for comparing the current and driving synchronous switch. Dead time is not stable and changes with the variation of the supply voltage of the primary side in the above-mentioned fly-back type power supply. The dead time lasts longer when the supply voltage is low; therefore, the utilization rate of the synchronous switch is worse. Because the current comparator is made of an iron core and a coil, it cannot be used in integrated circuits.

SUMMARY OF THE INVENTION

The present invention provides a synchronous rectifier with a dead time adjusting function, and the adjusted dead time is fixed to improve the drawbacks made by the unstable dead time. Furthermore, the synchronous rectifier with adjusting dead time function may be integrated into an IC (integrate circuit) to shrink the product volume and reduce its cost.

The present synchronous rectifying circuit is used in a fly-back power supply. The present invention is connected to a secondary side of a transformer, a capacitor, an output source, and a first electric switch. The present invention sets a rectifying circuit, charging circuit, regulated power circuit, trigger circuit, comparing circuit, and a logic circuit.

The rectifying circuit is connected to a secondary side of the transformer and rectifies the alternating voltage of the secondary side into a voltage with positive half-cycle. The charging circuit is connected to the rectifying circuit to produce a first charging voltage and a second charging voltage. The regulated power circuit is connected to the charging circuit and produces a reference voltage by the first charging voltage. The trigger circuit is connected to the charging circuit and the rectifying circuit, and produces a pulse signal according to the output voltage of the rectifying circuit; the trigger circuit also produces a comparing signal for adjusting dead time by operating with the second charging voltage. The comparing circuit is connected to the regulated power circuit, the trigger circuit, and the charging circuit; it compares a reference voltage and a comparing signal of dead time adjusting to output a dead time adjusting signal. The logic circuit is connected to the comparing circuit and the rectifying circuit to do AND logic operation with dead time adjusting signals and the positive half-cycle voltage; finally it will output a first driving signal to control the on/off states of a first electric switch.

The present invention may adjust the dead time of circuit switch states and fix the dead time by regulating R and C values of the circuit. Therefore, dead time is not influenced by the unstable duty cycle of the pulse width modulation and the unstable dead time will be improved.

The various objects and advantages of the present invention will be more readily understood from the following detailed description when read in conjunction with the appended drawing, in which:

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, in which.

DETAILED DESCRIPTION OF PREFERRED EMBODIMENTS

Figure 1:
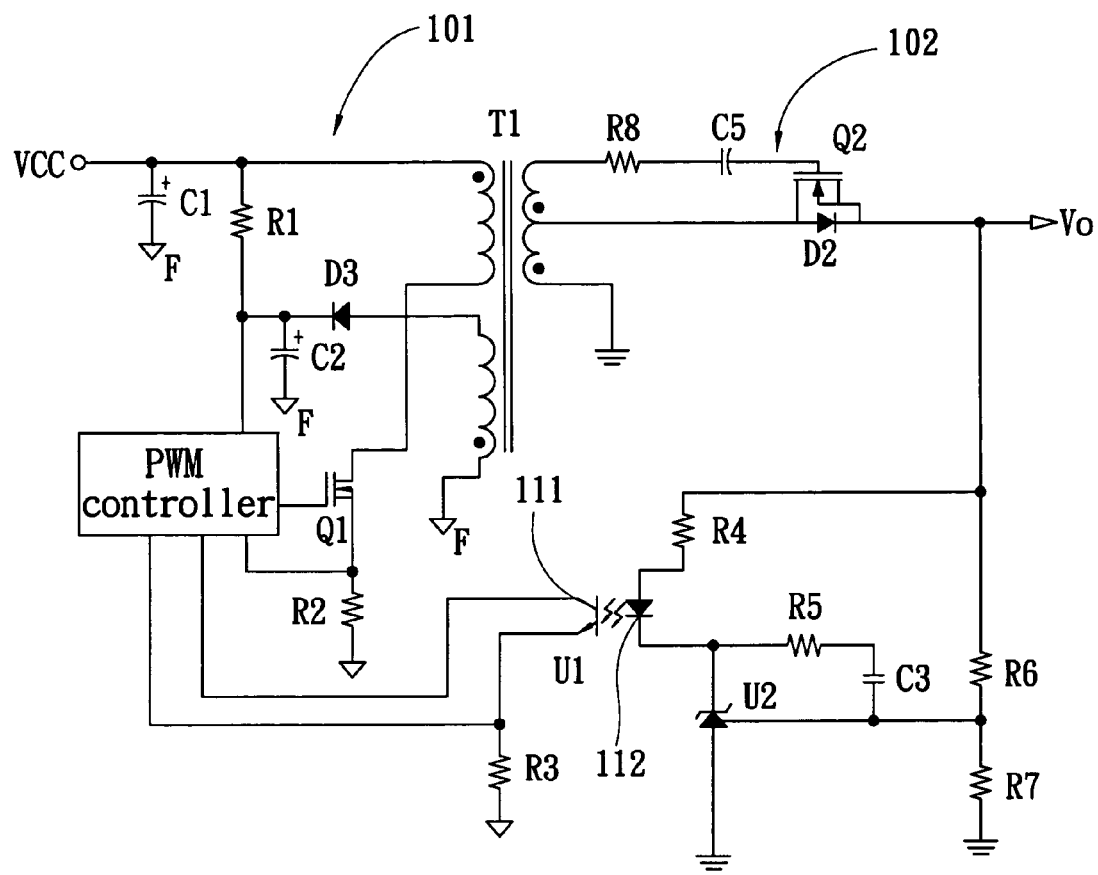
FIG. 1 shows a prior art schematic diagram of a fly-back power supply.
Figure 2:
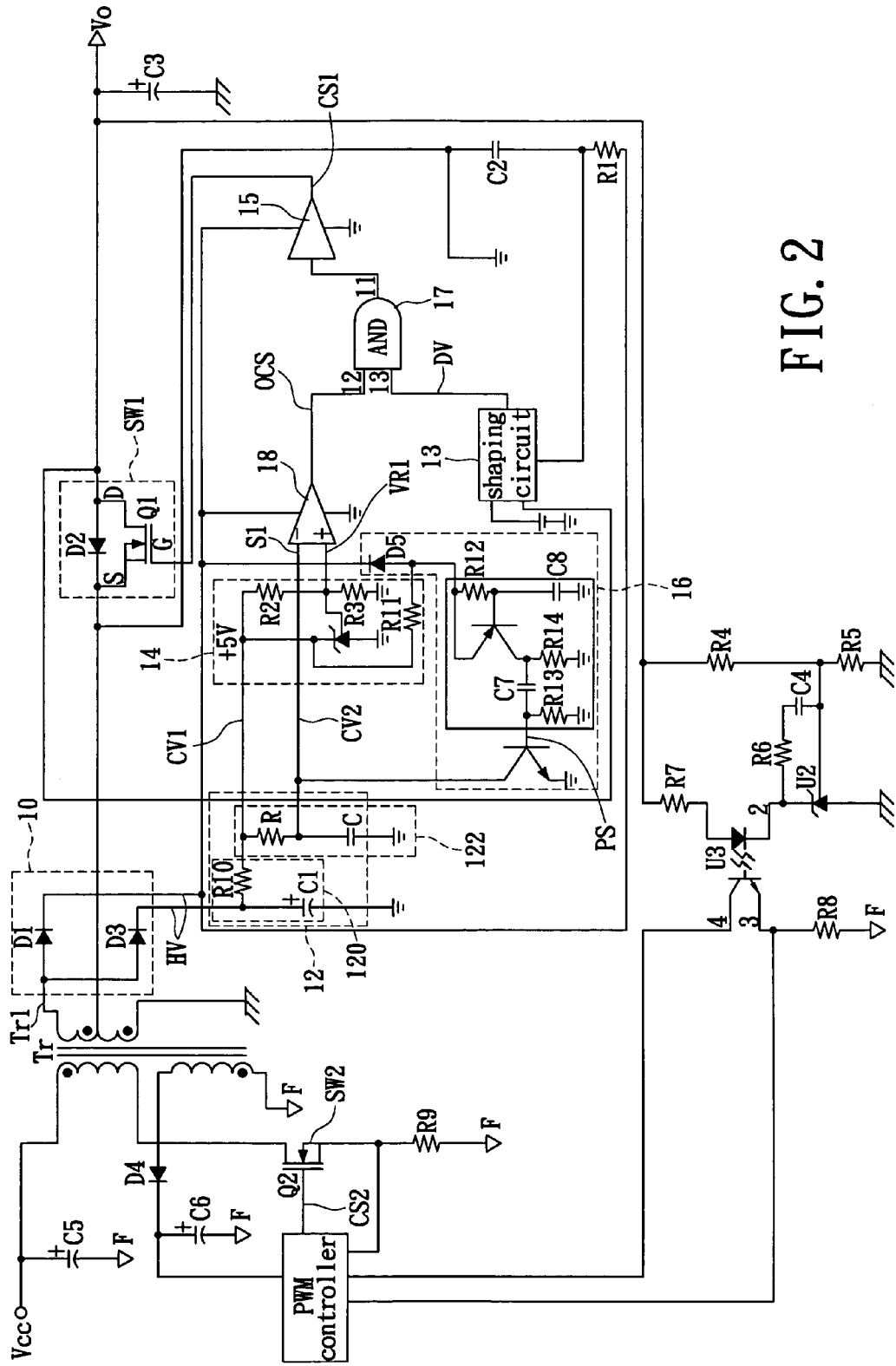
FIG. 2 shows a schematic diagram of a fly-back power supply of the present invention.

Reference is made to FIG. 2; it shows a fly-back power supply of the present invention. The fly-back power supply according to the present invention is connected to a secondary side Tr1 of a transformer Tr, a capacitor C3, an output power source Vo and a first electric switch SW1. The fly-back power supply also comprises a rectifying circuit 10, a charging circuit 12, a power-regulating circuit 14, a trigger circuit 16, a comparing circuit 18 and a logic circuit 17.

The rectifying circuit 10 is connected to the secondary side terminal Tr1 of the transformer Tr, which rectifies an alternating voltage of the secondary side terminal Tr1 into a positive half-cycle voltage HV and transmits the positive half-cycle voltage HV to the rectifying circuit 10 and the charging circuit 12. The charging circuit 12 includes a first charging unit 120 and a second charging unit 122. The first charging unit 120 is connected to the rectifying circuit 10 and charged by the positive half-cycle voltage HV to output a first charging voltage CV1; the second charging unit 122 is connected to the first charging unit 120 and charged by the first charging voltage CV1 to output a second charging voltage CV2. The above-mentioned charging circuit 12 is a RC charging circuit, and the charging circuit 10 is made of at least one diode.

Further, the power-regulating circuit 14 is connected to the charging circuit 12 to receive the first charging voltage CV1. The first charging voltage CV1 will regulate power and a stable reference voltage VR1 is thus made. The trigger circuit 16 is connected to the charging circuit 10 and the charging circuit 12. The positive half-cycle voltage makes a trailing trigger for outputting a pulse signal PS. The pulse signal PS drives on/off states of a transistor switch to lower the voltage level of the second charging voltage CV2 to zero. A dead time adjusting comparing signal S1 is output by utilizing the second charging voltage CV2 the pulse signal PS. A positive output terminal of the comparing circuit 18 is connected to the regulated circuit 14; a negative terminal of the comparing circuit 18 is connected to the charging circuit 12 and the trigger circuit 16. The negative terminal receives the reference voltage VR1 and the dead time adjusting comparing signal S1. After comparing the above-mentioned voltage VR1 and signal S1, a dead time adjusting signal OCS will be output.

Furthermore, a shaping circuit 13 is connected to the output power source Vo and the rectifying circuit 10 to convert the positive half-cycle voltage HV into a shaping voltage DV. The logic circuit 17 is connected to the comparing circuit 18 and the shaping circuit 13. The logic circuit will do an AND operation with the dead time adjusting signal OCS and the shaping voltage DV for outputting a first driving signal. The first driving signal will be transmitted to a driving circuit 15 connected to logic circuit 17. The driving circuit 15 receives the first driving signal and generates a control signal CS1 to control on/off states of the first electric switch SW1.

Figure 3:
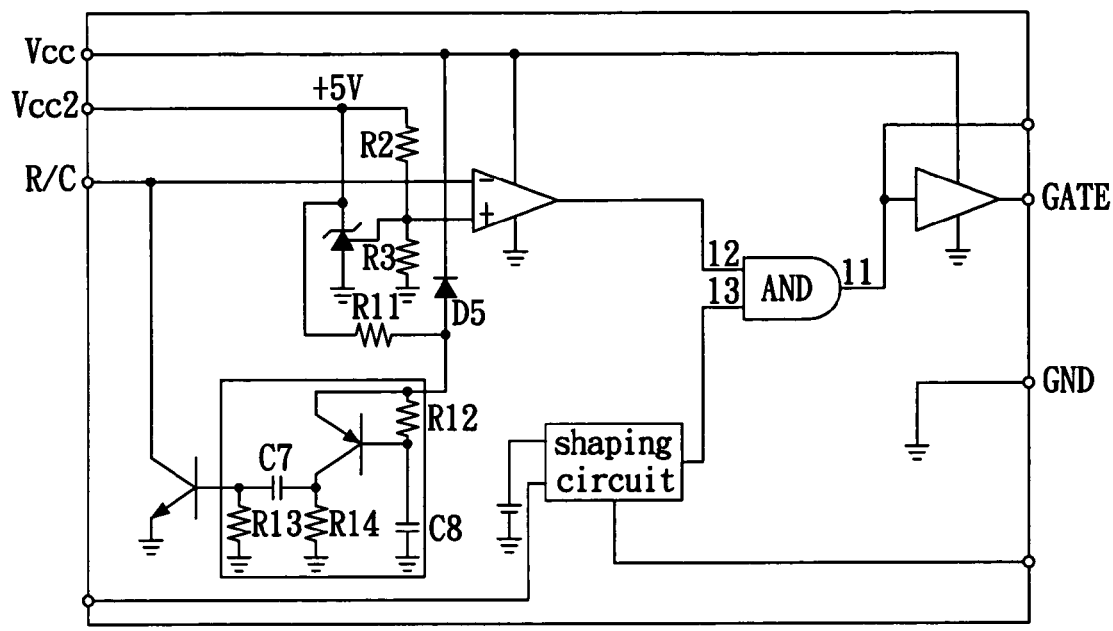
FIG. 3 shows a schematic diagram of an integrated circuit with dead time adjusting function in the present invention.

FIG. 3 depicts a schematic diagram of a synchronous rectifier circuit with dead time adjusting function. It is one part of the circuit in FIG. 2 and packages the regulated power circuit 14, the trigger circuit 16, the comparing circuit 18, the shaping circuit 13, the logic circuit 17 and the driving circuit 15 into one control integrated circuit 2. As FIG. 3 shows, the pins thereof comprise a first power source pin Vcc, a ground pin GND, a second power source pin Vcc2, a charging input pin R/C and a first output pin GATE.

Figure 4:
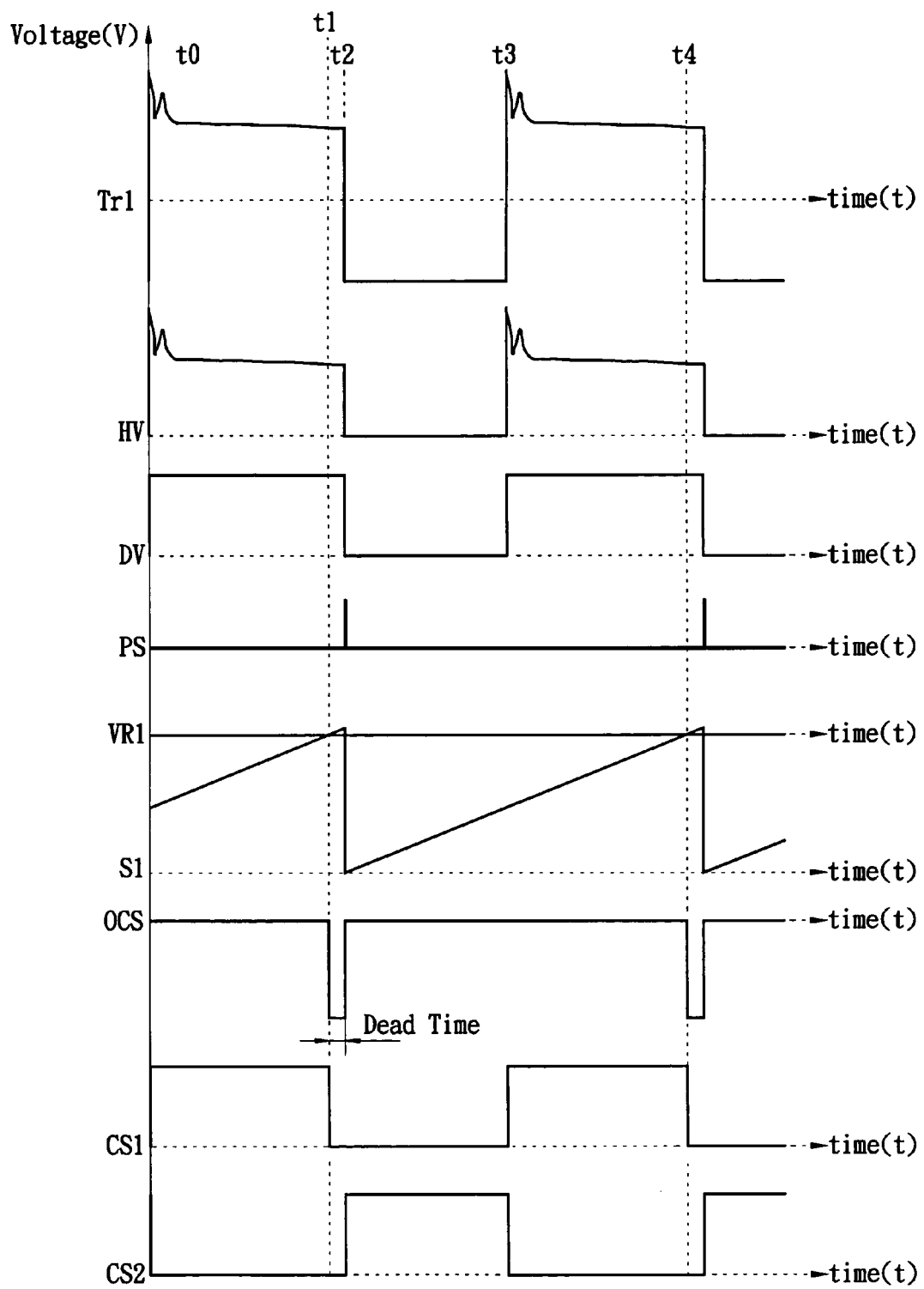
FIG. 4 shows a wave schematic diagram of a fly-back power supply in the present invention.

Reference is made to FIG. 3 and FIG. 4. FIG. 4 shows a schematic wave form diagram of a fly-back power supply, in which a transverse axis is a time axis t, and a vertical axis is a voltage axis v. During a time period t0–t1, the secondary side Tr1 of the transformer Tr provides a positive voltage to the rectifying circuit 10 for outputting a positive half-cycle voltage HV with high voltage potential. Afterward, the voltage HV is sent to the shaping circuit 13 for outputting a stable shaping voltage DV with high voltage potential. Finally, the shaping voltage DV is transmitted to the logic circuit 17.

In the meantime, the regulated power circuit 14 outputs a reference voltage VR1 and voltage potential thereof is higher than a dead time adjusting comparing signal S1 output by the charging circuit 12 and the trigger circuit 16. Then, the reference voltage VR1 and the dead time adjusting comparing signal S1 are operated by the comparing circuit 18 for outputting a dead time adjusting signal OCS with high voltage potential. The shaping voltage DV and the dead time adjusting signal OCS will be sent to the logic circuit 17 for AND logic operation and outputting a first driving signal with high potential to control the driving circuit 15. The driving circuit 15 generates a first control signal CS1 with high voltage potential to turn the first electric switch SW1 on.

Furthermore, the electric poles of the primary side of the transformer Tr1 are opposite to poles of the secondary side. Therefore, the voltages detected by two sides have different electrical-polarity. Additionally, a second electric switch SW2 on the primary side of the transformer Tr is off and receives a second control signal CS2 with low voltage potential.

During a time period t1–t2, the secondary side Tr1 of the transformer Tr still provides positive voltage potential to the rectifying circuit 10. Therefore, the rectifying circuit 10 will output a positive half-cycle voltage HV. The positive half-cycle voltage HV will be transmitted to the shaping circuit 13, and a stable shaping voltage DV with high voltage potential will be output by the shaping circuit 13 and transmitted to the logic circuit 17.

In the meantime, the regulated power circuit 14 outputs a reference voltage VR1 and voltage potential thereof is lower than a dead time adjusting comparing signal S1 output by the charging circuit 12 and the trigger circuit 16. After that, the reference voltage VR1 and the dead time adjusting comparing signal S1 are operated by the comparing circuit 18 for outputting a dead time adjusting signal OCS with low voltage potential. The shaping voltage DV and the dead time adjusting signal OCS are then sent to the logic circuit 17 for AND logic operation, and outputting a first driving signal with low potential to control the driving circuit 15. The driving circuit 15 generates a first control signal CS1 with low voltage potential to turn the first electric switch SW1 off.

Furthermore, the electric poles of the primary side of the transformer Tr1 are opposite to poles of the secondary side. Hence, the second electric switch SW2 on the primary side of the transformer Tr is still off and receives a second control signal CS2 with low voltage potential.

At time t2, the positive half-cycle voltage HV is trailingly triggered by the trigger circuit 16 to produce a pulse signal PS. Meanwhile, the pulse signal PS reduces the voltage potential of the second charging voltage CV2 to zero potential and also makes the dead time adjusting comparing signal S1 be at zero potential.

During a time period t2–t3, the secondary side Tr1 of the transformer Tr provides negative voltage potential to the rectifying circuit 10. Therefore, the rectifying circuit 10 will output a positive half-cycle voltage HV. Then, the positive half-cycle voltage HV is transmitted to the shaping circuit 13 and a stable shaping voltage DV with high voltage potential will be output by the shaping circuit 13 and transmitted to the logic circuit 17.

In the meantime, because the dead time adjusting comparing signal S1 is reduced to zero potential by the pulse signal PS, the regulated power circuit 14 outputs a reference voltage VR1 and voltage potential thereof is higher than a dead time adjusting comparing signal S1, the dead time adjusting comparing signal S1 is output by the charging circuit 12 and the trigger circuit 16. After that, the reference voltage VR1 and the dead time adjusting comparing signal S1 are operated by the comparing circuit 18, and the comparing circuit 18 outputs a dead time adjusting signal OCS with high voltage potential. The shaping voltage DV and the dead time adjusting signal OCS are then sent to the logic circuit 17 for AND logic operation, and outputting a first driving signal with low potential to control the driving circuit 15. The driving circuit 15 generates a first control signal CS1 with low voltage potential to turn the first electric switch SW1 off.

Furthermore, the electric poles of the primary side of the transformer Tr1 are opposite to poles of the secondary side. Hence, the second electric switch SW2 on the primary side of the transformer Tr is on and receives a second control signal CS2 with high voltage potential. After the time period t3–t4 finishes, the shapes of signals will repeat and start from the above-mentioned time period t0–t1.

Reference is made to FIG. 2 and FIG. 4. At time period t1–t2, the first electric switch SW1 and the second electric switch SW2 are off at the same time, and the period of time is called the dead time of the circuit.

As FIG. 4 shows, dead time is related to the reference voltage VR1 and the dead time adjusting comparing signal S1 The reference voltage VR1 will be fixed, and the R and C values of the second charging circuit 122 will be adjusted to regulate the charging time of the second charging voltage CV2 and the slope of the dead time adjusting comparing signal S1. Therefore, dead time will thus be adjusted.

The present invention may adjust dead time of the circuit switch and fix the dead time by regulating the R and C value of the second charging unit 122. Dead time will not be influenced by unstable duty cycle of the direct output voltage controlled by pulse width modulation. Hence, the drawbacks of the first electric switch SW1, such as low use rate and being easily burnt up, will be resolved for the sake of stable dead time.

Although the present invention has been described with reference to the preferred embodiment therefore, it will be understood that the invention is not limited to the details thereof. Various substitutions and modifications have suggested in the foregoing description, and other will occur to those of ordinary skill in the art. Therefore, all such substitutions and modifications are intended to be embrace within the scope of the invention as defined in the appended claims.

What is claimed is:

1. A synchronous rectifier with dead time adjusting function, connected to a secondary side of a transformer, a capacitor, an output power source and a first electric switch, comprising:
    a rectifying circuit connected to a secondary side terminal of a transformer and rectifying an alternating voltage of the secondary side terminal into a positive half-cycle voltage;
    a charging circuit connected to the rectifying circuit and producing a first charging voltage and a second charging voltage;
    a regulated power circuit connected to the charging circuit and receiving the first charging voltage to produce a reference voltage;
    a trigger circuit connected to the rectifying circuit and the charging circuit for generating a pulse signal, wherein a dead time adjusting comparing signal is output by the pulse signal and the second charging voltage;
    a comparing circuit connected to the regulated circuit, the charging circuit, and the trigger circuit, wherein the comparing circuit compares the dead time adjusting comparing signal with the reference voltage to produce a dead time adjusting signal; and
    a logic circuit connected to the comparing circuit and the rectifying circuit, wherein the logic circuit performs an AND logic operation with the dead time adjusting comparing signal and the positive half-cycle voltage to output a first driving signal for controlling on/off states of the first electric switch.

2. The synchronous rectifier with dead time adjusting function as in claim 1, wherein the charging circuit comprises:
    a first charging unit connected to the rectifying circuit for outputting the first charging voltage; and
    a second charging unit connected to the first charging unit for outputting the second charging voltage.

3. The synchronous rectifier with dead time adjusting function as in claim 1, further comprising a shaping circuit connected to the rectifying circuit and the logic circuit, wherein the shaping circuit transforms a positive half-cycle voltage into a shaping voltage and transmits the shaping voltage to the logic circuit.

4. The synchronous rectifier with dead time adjusting function as in claim 1, further comprising a driving circuit connected to the logic circuit and the first electric switch, wherein the driving circuit receives the first driving signal for generating a first control signal and the first control signal controls on/off states of the first electric switch.

5. The synchronous rectifier with dead time adjusting function as in claim 1, wherein the charging circuit is an RC charging circuit.

6. The synchronous rectifier with dead time adjusting function as in claim 1, wherein the rectifying circuit includes at least one diode.

7. The synchronous rectifier with dead time adjusting function as in claim 1, wherein the regulated power circuit, comparing circuit, logic circuit, and a trigger circuit are packaged into a control integrated circuit and the control integrated circuit comprises a first power source pin, a ground pin, a second power source pin, a charging input pin, and a first output pin.

8. A synchronous rectifier with dead time adjusting function connected to a secondary side of a transformer, an output power source and a first electric switch, comprising:
    a rectifying circuit connected to a secondary side terminal of a transformer and outputting a positive half-cycle voltage;
    a charging circuit connected to the rectifying circuit;
    a regulated power circuit connected to the charging circuit and producing a reference voltage;
    a trigger circuit connected to the rectifying circuit and the charging circuit for generating a pulse signal;
    a comparing circuit connected to the regulated circuit, the charging circuit and the trigger circuit and producing a dead time adjusting signal; and
    a logic circuit connected to the comparing circuit and the rectifying circuit and outputting a first driving signal for controlling on/off states of the first electric switch.

9. The synchronous rectifier with a dead time adjusting function as in claim 8, wherein the logic circuit performs an AND logic operation with the dead time adjusting comparing signal and the positive half-cycle voltage.

10. The synchronous rectifier with dead time adjusting function as in claim 8, wherein the regulated power circuit, comparing circuit, logic circuit, and a trigger circuit are packaged into a control integrated circuit, and the control integrated circuit comprises a first power source pin, a ground pin, a second power source pin, a charging input pin, and a first output pin.

* * * * *